(12) United States Patent     (10) Patent No.: US 12,375,205 B1
Farhoodfar et al.     (45) Date of Patent: Jul. 29, 2025

(54) SYSTEMS AND METHODS FOR PERFORMANCE MONITORING WITH FORWARD ERROR CORRECTION MECHANISM

(71) Applicant: MARVELL ASIA PTE LTD, Singapore (SG)

(72) Inventors: Arash Farhoodfar, Milpitas, CA (US); Vlad Shyvdun, Union City, CA (US); Michael Duckering, Kanata (CA); Michael Takefman, Nepean (CA); Devin Linnington, Kanata (CA)

(73) Assignee: MARVELL ASIA PTE LTD, Singapore (SG)

( * ) Notice: Subject to any disclaimer, the term of this patent is extended or adjusted under 35 U.S.C. 154(b) by 12 days.

(21) Appl. No.: 18/541,298

(22) Filed: Dec. 15, 2023

(51) Int. Cl.
    *H04L 1/00*        (2006.01)
    *H03M 13/00*      (2006.01)
    *H04L 1/20*        (2006.01)

(52) U.S. Cl.
    CPC .......... *H04L 1/0045* (2013.01); *H04L 1/0057* (2013.01); *H04L 1/203* (2013.01)

(58) Field of Classification Search
    CPC ...... H04L 1/0045; H04L 1/0057; H04L 1/203
    See application file for complete search history.

(56) References Cited

U.S. PATENT DOCUMENTS

| | | | |
|---|---|---|---|
| 8,522,116 B2 * | 8/2013 | Shafrir | H03M 13/6306 |
| | | | 714/776 |
| 11,265,025 B2 * | 3/2022 | Shvydun | H03M 13/153 |
| 2020/0228146 A1 * | 7/2020 | Shvydun | H03M 13/617 |

* cited by examiner

*Primary Examiner* — Justin R Knapp

(57) ABSTRACT

The present invention relates to data communication systems and methods thereof. In a specific embodiment, a receiver includes a trigger circuitry that selects a subset of encoded data blocks to measure the performance of a communication lane. Partial syndromes—based on these partial data blocks—are used in partial syndrome calculations, and they are later combined to form full syndromes. A decoder is configured to decode the full syndromes. There are other embodiments as well.

21 Claims, 15 Drawing Sheets

SYSTEMS AND METHODS FOR PERFORMANCE MONITORING WITH FORWARD ERROR CORRECTION MECHANISM

FIELD OF THE INVENTION

The present invention relates to data communication systems and methods thereof.

BACKGROUND

Modern internet and mobile applications demand a huge amount of bandwidth for transferring photos, video, music, and other multimedia files. To meet these bandwidth and capacity demands, high-speed data communication systems are deployed. Considerable research and development efforts have been made to improve the bandwidth capacity of optical communication systems. For example, given the physical limitations of optical communication links, various advanced signaling techniques, such as high-order QAM, and digital signal processing, among others, have been employed to achieve high data rates (e.g., 400 Gbps).

BRIEF SUMMARY OF THE INVENTION

The present invention relates to data communication systems and methods thereof. In a specific embodiment, a receiver includes a trigger circuitry that selects a subset of encoded data blocks to measure the performance of a communication lane. Partial syndromes—based on these partial data blocks—are used in partial syndrome calculations, and they are later combined to form full syndromes. A decoder is configured to decode the full syndromes. There are other embodiments as well.

A system of one or more computers, or logic units of communication or data processing equipment, can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by the data processing apparatus, cause the apparatus to perform the actions. One general aspect provides a receiver device, which includes a first input port for receiving a first data stream. The first data stream may include encoded data blocks. The device also includes a first distribution circuitry for distributing the first data stream into a first FEC data stream and a second FEC data stream. The device also includes a first alignment circuitry configured for aligning FEC data blocks of the first FEC data stream. The device also includes a first trigger circuitry coupled to the first alignment circuitry. The first trigger circuitry may be configured to select a first plurality of FEC data blocks from the first data stream. The device also includes a first partial syndrome calculator configured to determine a first partial syndrome. The device also includes a syndrome combiner configured to generate a full syndrome by combining the first partial syndrome with at least a second partial syndrome. The device also includes an FEC decoder configured to decode the full syndrome. Other embodiments of this aspect include corresponding computer systems, apparatus, and computer programs recorded on one or more computer storage devices, each configured to perform the actions of the methods.

One general aspect includes a receiver device that has an input port for receiving a data stream. The data stream may include encoded data blocks. The device also includes a distribution circuitry for distributing the data stream into a first FEC data stream and a second FEC data stream. The device also includes a first alignment circuitry configured for aligning FEC data blocks of the first FEC data stream. The device also includes a second alignment circuitry configured for aligning the second FEC data stream. The device also includes a first trigger circuitry coupled to the first alignment circuitry. The first trigger circuitry may be configured to select a first plurality of FEC data blocks from the data stream. The device also includes a second trigger circuitry coupled to the second alignment circuitry. The device also includes a first partial syndrome calculator configured to determine a first partial syndrome. The device also includes a second partial syndrome calculator configured to determine a second partial syndrome. The device also includes a syndrome combiner configured to generate a full syndrome by combining the first partial syndrome with at least the second partial syndrome. The device also includes an FEC decoder configured to decode the full syndrome. Other embodiments of this aspect include corresponding computer systems, apparatus, and computer programs recorded on one or more computer storage devices, each configured to perform the actions of the methods.

One general aspect includes a data communication method, which includes receiving a data stream from a communication link. The method also includes distributing the data stream to a first FEC stream and a second FEC stream. The method also includes aligning the first FEC stream. The method also includes aligning the second FEC stream. The method also includes generating a first partial syndrome based on the first FEC stream. The method also includes generating a second partial syndrome based on the second FEC stream. The method also includes determining a BER value using at least the first partial syndrome. The method also includes generating a full syndrome using at least the first partial syndrome and the second partial syndrome. The method also includes decoding the full syndrome. Other embodiments of this aspect include corresponding computer systems, apparatus, and computer programs recorded on one or more computer storage devices, each configured to perform the actions of the methods.

It is noted that embodiments of the present invention provide many advantages over conventional techniques. Among other things, by subsampling code blocks for the purpose of error rate (and/or other metrics) calculation, as afforded by trigger circuitry in various embodiments, the performance of communication lanes can be efficiently and quickly determined. As explained below, performance indications as determined using various implementations of the present invention are highly usable and accurate, and they are obtained at—compared to existing technology—higher speed and lower power consumption. It is also noted that partial syndrome calculation techniques, as used in various embodiments, allow for multiple chips to work together.

Embodiments of the present invention can be implemented in conjunction with existing systems and processes. For example, performance monitoring techniques according to various embodiments of the present invention can be implemented in conjunction with existing techniques and standards (e.g., IEEE ethernet standards). Also, implementations of the present invention can be manufactured using existing manufacturing techniques and equipment, and they are thus readily adoptable and deployable. There are other benefits as well.

The present invention achieves these benefits and others in the context of known technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

Figure 1A:
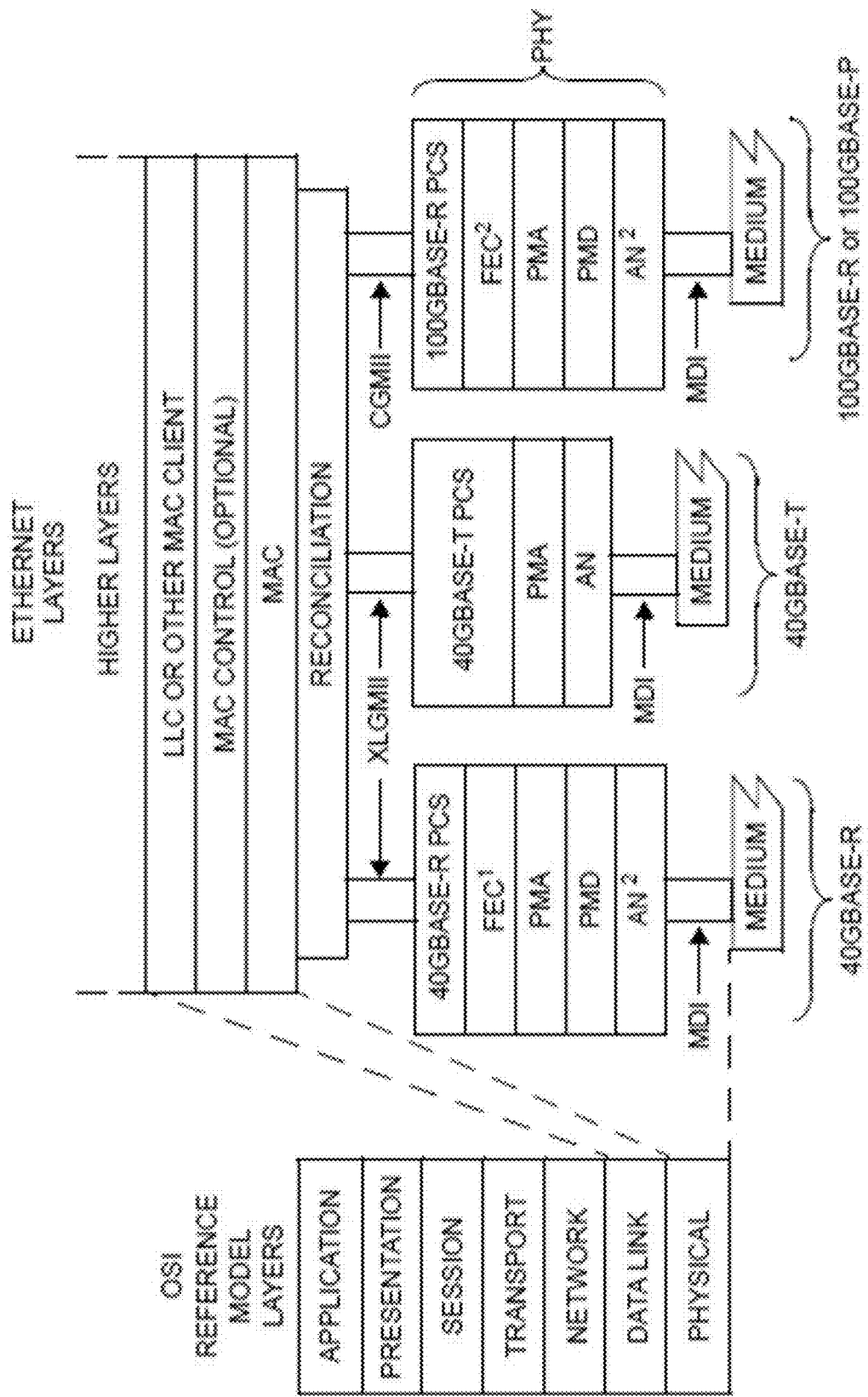
FIG. 1A is a block diagram illustrating the protocol sub-layers of one version of the Ethernet Physical Layer.

The present invention relates to data communication systems and methods for communication over a wired or fiber optics interface. In a specific embodiment, a receiver includes a trigger circuitry that selects a subset of encoded data blocks to measure the performance of a communication lane. Partial syndromes-based on these partial data blocks—are used in partial syndrome calculations and can indicate error rate, and they are later combined to form full syndromes. A decoder is configured to decode the full syndromes. There are other embodiments as well.

Digital communications systems have evolved in the interest of increased data throughput with an acceptable rate of transmission errors. Modern communications systems contain various forms of error detection circuitries to ensure that data integrity is maintained. Such error detection circuitries create additional check bits, such as cyclical redundancy check (CRC), which are added to the data stream as part of the transmitter to allow the receiver to verify the correctness of the data packet.

Various different parameters are used to describe and contrast different technologies and techniques. In a simplified view of the system, there are four main figures of merit to be considered: (1) baud rate (the rate at which symbols are transmitted), (2) modulation rate (the number of bits contained in each transmitted symbol), (3) framing methodology (with an associated data overhead), and (4) received bit error rate (BER). Baud rate and modulation rate dictate the raw data throughput. The framing methodology sets useful data throughput; framing bits are critical to the system functioning, but do not convey user data. The BER is an indication of the quality of the received data: the lower the BER the better the quality because fewer bits are received in error.

Early digital communications systems relied on error detection circuitries to determine if data had been corrupted during transmission, and higher-level protocols would cause retransmission of corrupted data. When the BER value is sufficiently low, retransmission functions well, and the net user data throughput is acceptable. However, as the BER value rises, the overall throughput drops due to increased retransmissions. In the presence of relatively high BER, the link can become unusable as the useful throughput can drop to 0.

Forward Error Correction (FEC) techniques have been used to improve the BER of a link. FEC increases the overhead of data frames and then employs advanced coding techniques that enable the receiver to detect errors in received data and then correct them, for instance by sending redundant information. It is important to note that the error detection mechanism remains in place. Even if the FEC mechanism cannot correct errors, the CRC mechanism nevertheless should still detect the presence of an error. The inclusion of an FEC function has been shown to lower the effective BER of a link and thereby increase network throughput by lowering the number of data errors and reducing the amount of retransmissions that are required. In general, the addition of FEC into a communications system can be warranted when the additional overhead and complexity of FEC offsets the loss of data throughput due to retransmissions.

Network operators typically monitor error rates on communication channels. An increase in error rates—accumulated overtime—is often a warning that a channel is trending towards failure in the future. Monitoring the packet error rate is a common technique; however, when an FEC scheme is used, the packet error rate may not be a true measure of the actual error rate on the link. Therefore, monitoring the FEC error statistics becomes an important part of any communications system.

In a simplified view of a communication channel, the FEC encode and decode functions are added at the two ends of a link with only passive media (e.g., communication link)

between them. For example, the term "passive media" refers to communication links that do not actively modify data (e.g., perform data correction or provide signal boosting), and they are typically associated with relatively simple and predictable error patterns. This view does not reflect the reality of communication systems today where any number of components of electronic processing might exist between the endpoint transmitters and receivers that add/remove the FEC data. In transmission systems where signal power degradation occurs due to distance traveled through the media, a regeneration stage may be required to boost the transmission power. A retimer stage may be required to not only boost transmission power but to fix issues with degraded signal quality. By way of example, IEEE 802.3 Ethernet standard specifies many ethernet sub-layers that can retime/regenerate/increase baud rate/change modulation rate on a transmission stream without any need to add/subtract/modify the FEC data.

These intermediate operations do not modify the FEC data and these retimer/gearbox components are not designed with the capability of monitoring the FEC data due to the added expense of component area and equally importantly the increase in component power dissipation. As such, in a communication channel with a number of these stages, it is difficult to isolate which component(s) may be contributing to a BER/error rate observed at the endpoints. It is noted that embodiments of the present invention provide cost-effective BER monitoring that is implemented in conjunction with FEC techniques.

Various implementations are compatible with existing standards. For example, IEEE 802.3 specifies several FEC methods as part of the Ethernet Standard. The chosen FEC layer represents the consensus view (at the time) by the 802.3 Working Group and IEEE Standards Association Sponsor Ballot Group of an acceptable specification for the given link rate, type, and distance. For example, the IEEE 802.3 Ethernet Standard (IEEE 802.3-2018) describes a particular method of adding FEC to a particular MAC/PHY combination.

Various embodiments of the present invention provide an error detection mechanism that can determine error rates associated with specific network segments (often referred to as "network hops") through the use of—among other techniques—partial syndrome calculations, which can indicate errors associated with specific intermediate network hops. It is noted that error detection processes (and error rate determination) making use of partial syndrome calculation consume much less power and time than processes that perform full FEC decoding of an entire data stream. To locate and identify a problematic segment of a network path, it is advantageous to use error detection mechanism (e.g., using trigger circuitry and other mechanisms described below in detail) that are lower in complexity and are therefore faster and lower in power consumption than to perform decoding processes. Specifically, using partial syndrome calculations according to the present disclosure provides an effective error detection mechanism for data with FEC encoding. For example, data blocks may be interleaved into partial data blocks, and partial syndrome calculations are performed on these partial data blocks. The results of partial syndrome calculations are partial syndromes that are combined. Depending on the implementation, partial syndrome calculations may be implemented not as a decoding mechanism but as an FEC error detection mechanism, and they can be performed by more than one network device or chips. For example, partial syndrome calculations can be performed in parallel by multiple syndrome calculators and later combined (e.g., see FIG. 8). More specifically, different network devices or chips (e.g., on different network hops) can perform partial syndrome calculations, which are later combined into a full syndrome that is used for FEC error detection. For example, a non-zero full syndrome value indicates that the received data contain error(s).

FIG. 1A is a block diagram illustrating protocol sublayers of one version of the Ethernet Physical Layer, in accordance with an embodiment described herein. For example, FEC may be implemented as a part of the Ethernet standard according to the IEEE standard.

Figure 1B:
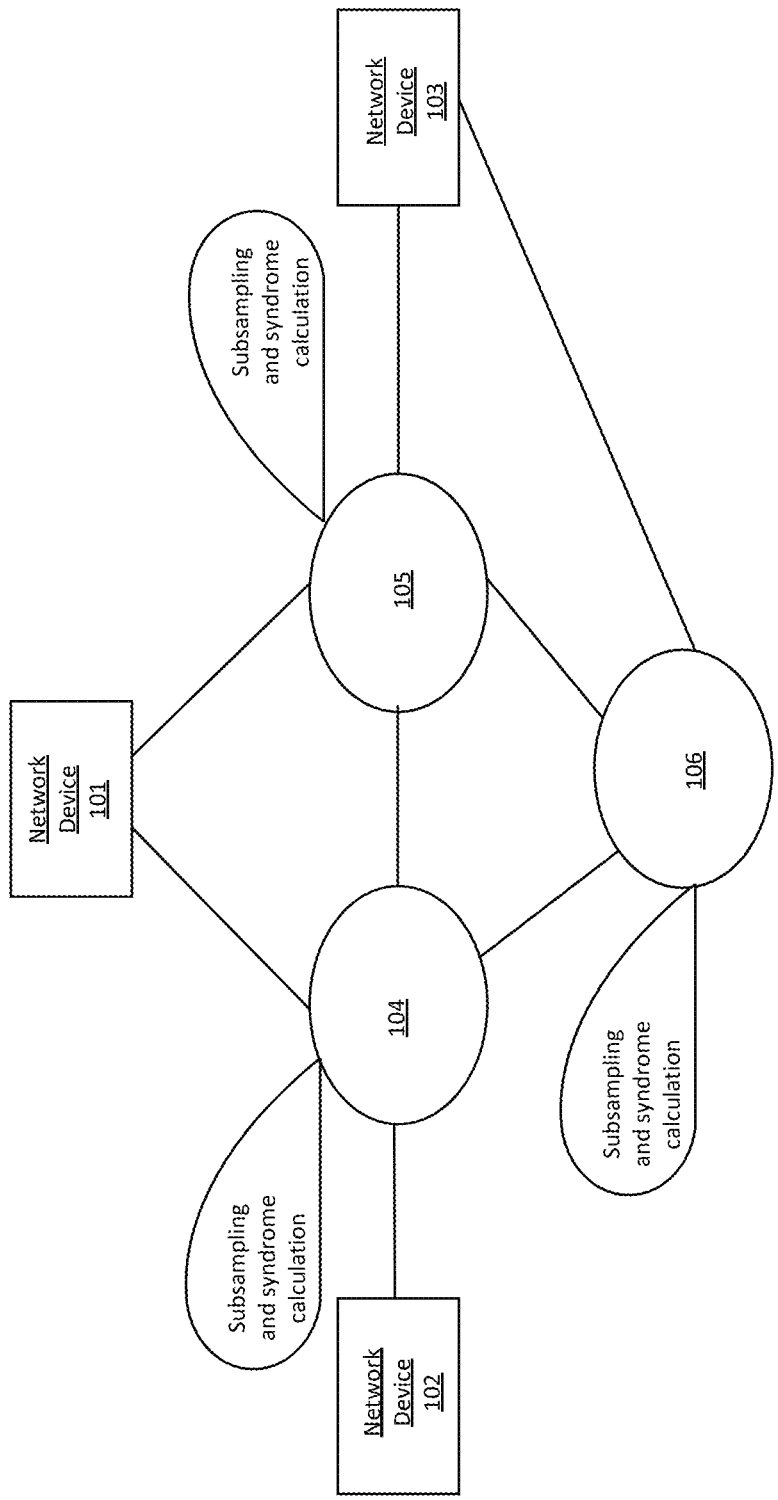
FIG. 1B is a simplified block diagram illustrating a network system with multiple network hops according to embodiments of the present invention.

FIG. 1B is a simplified block diagram illustrating a network system 100 with multiple network hops according to embodiments of the present invention. This diagram is merely an example, which should not unduly limit the scope of the claims. One of ordinary skill in the art would recognize many variations, alternatives, and modifications. Network entities 101-103 are connected to one another via network hops 104-106 as shown. For example, the network entities 101-103 may comprise network devices comprising transmitters and receivers. As an example, network entity 102 may send data to network entity 103 via network hops 104 and 105 (or via hops 104 and 106). In various embodiments, subsampling and partial syndrome calculations may be performed at one or more of these network hops to determine network quality (e.g., as measured in error rate). More detailed explanations are provided below.

Figure 2:
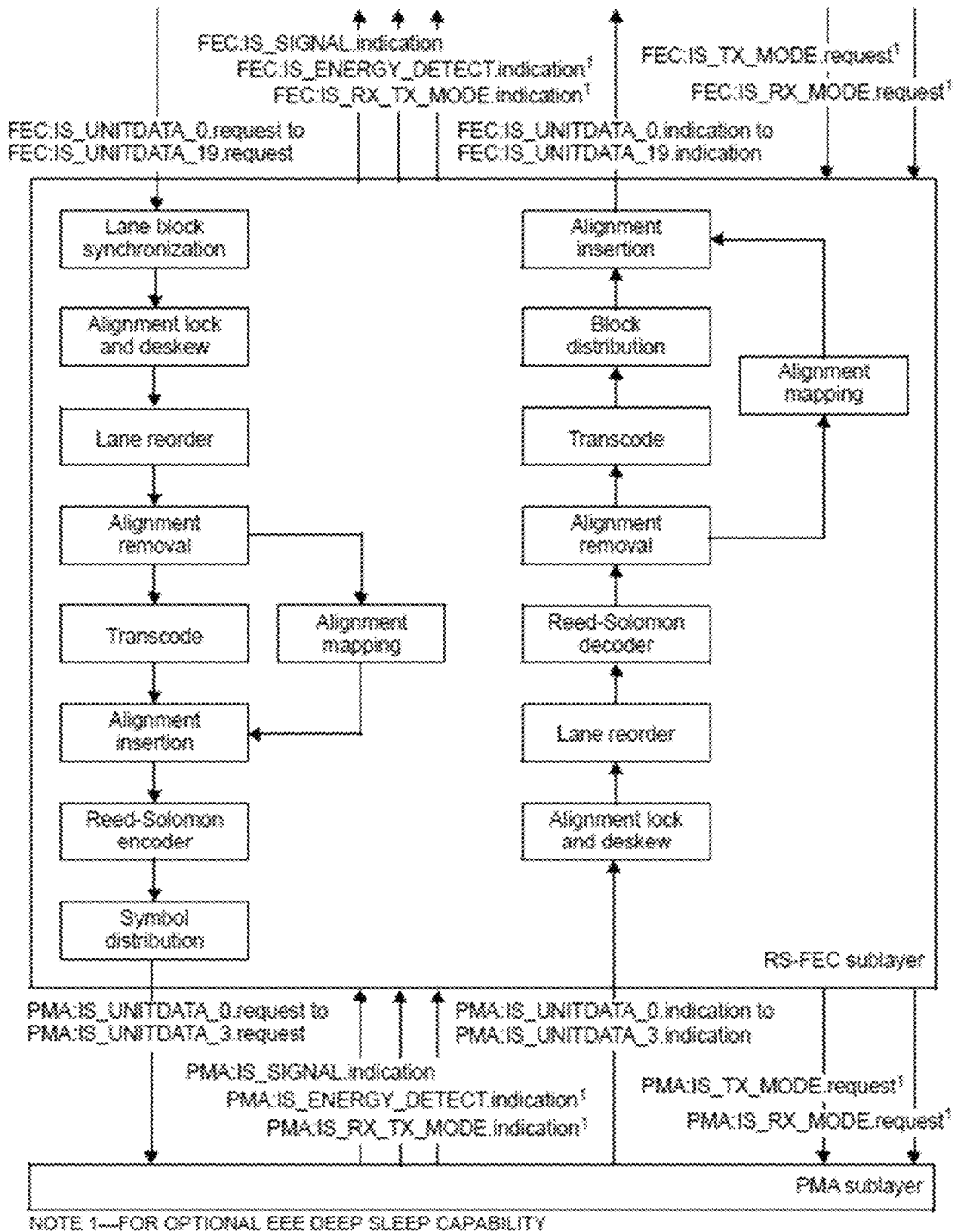
FIG. 2 is a block diagram illustrating the operation of FEC in a communication system.

FIG. 2 is a block diagram illustrating the operation of FEC in a communication system. For example, the functionalities of an FEC mechanism can be explained as the FEC sublayer functional block diagram from 802.3 (2018) Clause 91, which is incorporated by reference in its entirety. The right side of FIG. 2 shows the receive path of a device implementing the FEC layer; the left side shows encoding and transmission processes. For example, various embodiments of the present invention improve upon existing communication standards with fast network performance determination.

The IEEE 802.3 Standard specifies the number of different types of alignment markers, which depend on the clause/speed being supported. The alignment markers provide the receive functions to reassemble the data that has been sent over multiple physical links that may have different delays—potentially causing skew—and through wiring/fiber networks that may also cause positional movement. For example, depending on the implementation, different alignment marker schemes can be used. In one of the implementations, the Physical Coding Sublayer (PCS) layer has its alignment markers that identify 20 virtual lanes that the FEC layer removes (in the transmit direction). A new set of alignment markers is added just after transcoding, but before the FEC calculation is done. Finally, the FEC blocks are distributed over (in this case) 4 FEC lanes.

On the receiving side, the first block is the alignment lock/deskew block. In other standards, this would be referred to as a framing function. Lane reorder is the process that moves the alignment markers/data in both space and time to reconstruct the original 4 FEC lanes of data so that (Reed Solomon) FEC decoding can take place. Alignment markers are then removed. A transcoding function maps the blocks into a new format. The blocks are then distributed (into 20 PCS lanes). New alignment markers are added. The stream is then passed up to the next part of the PCS layer. For example, line quality monitoring—measured in BER values—can be performed at the Reed-Solomon (RS) decoder, where partial syndrome values are used for BER calculation according to various embodiments.

Figure 3A:
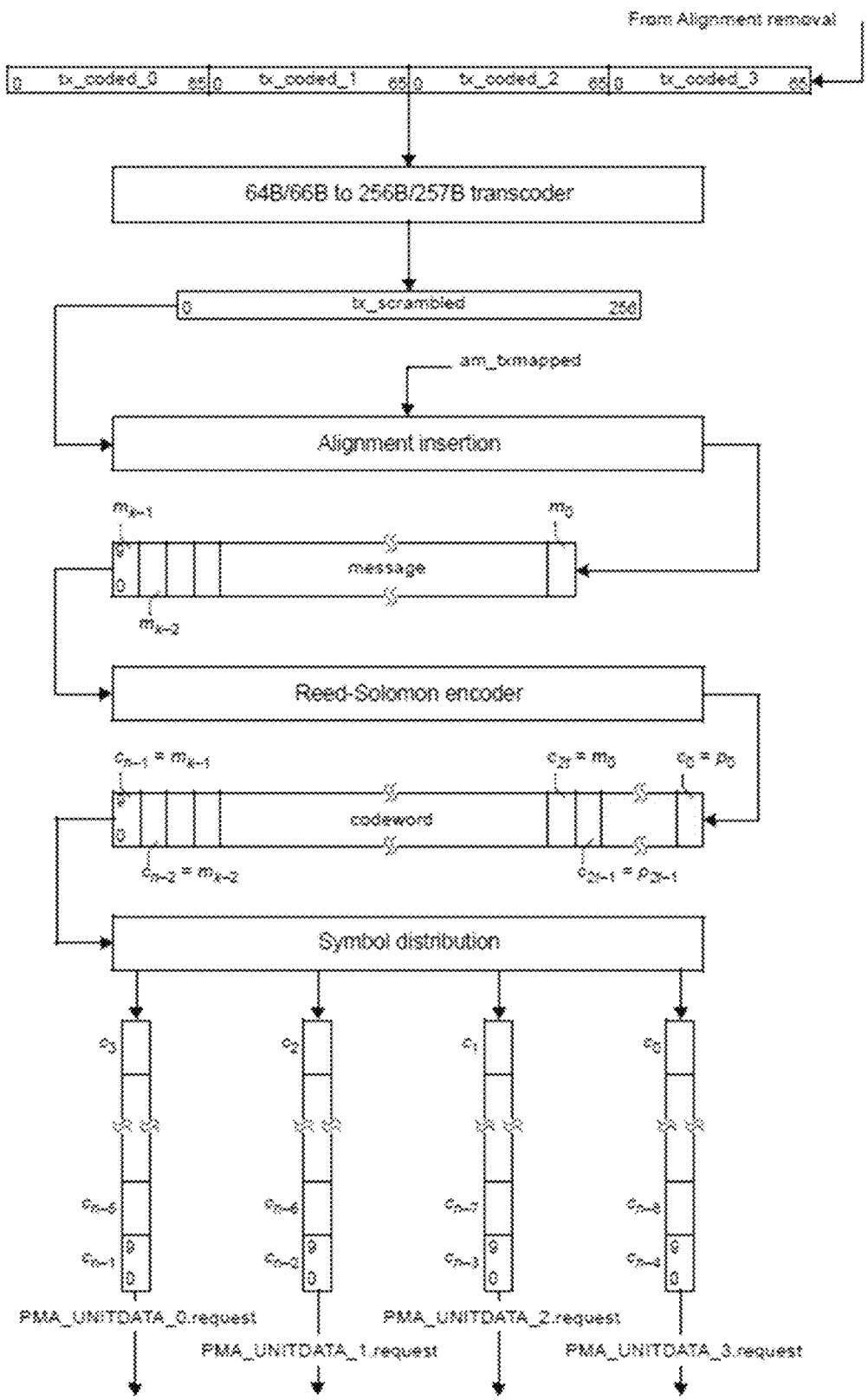
FIG. 3A is a block diagram illustrating a process for encoding and transmitting data.

FIG. 3A is a block diagram illustrating a process for encoding and transmitting data shown on the left side in FIG. 2. Among other features, Reed Solomon encoding may be provided, and Reed Solomon code words to FEC lanes are distributed in a round-robin manner.

Figure 3B:
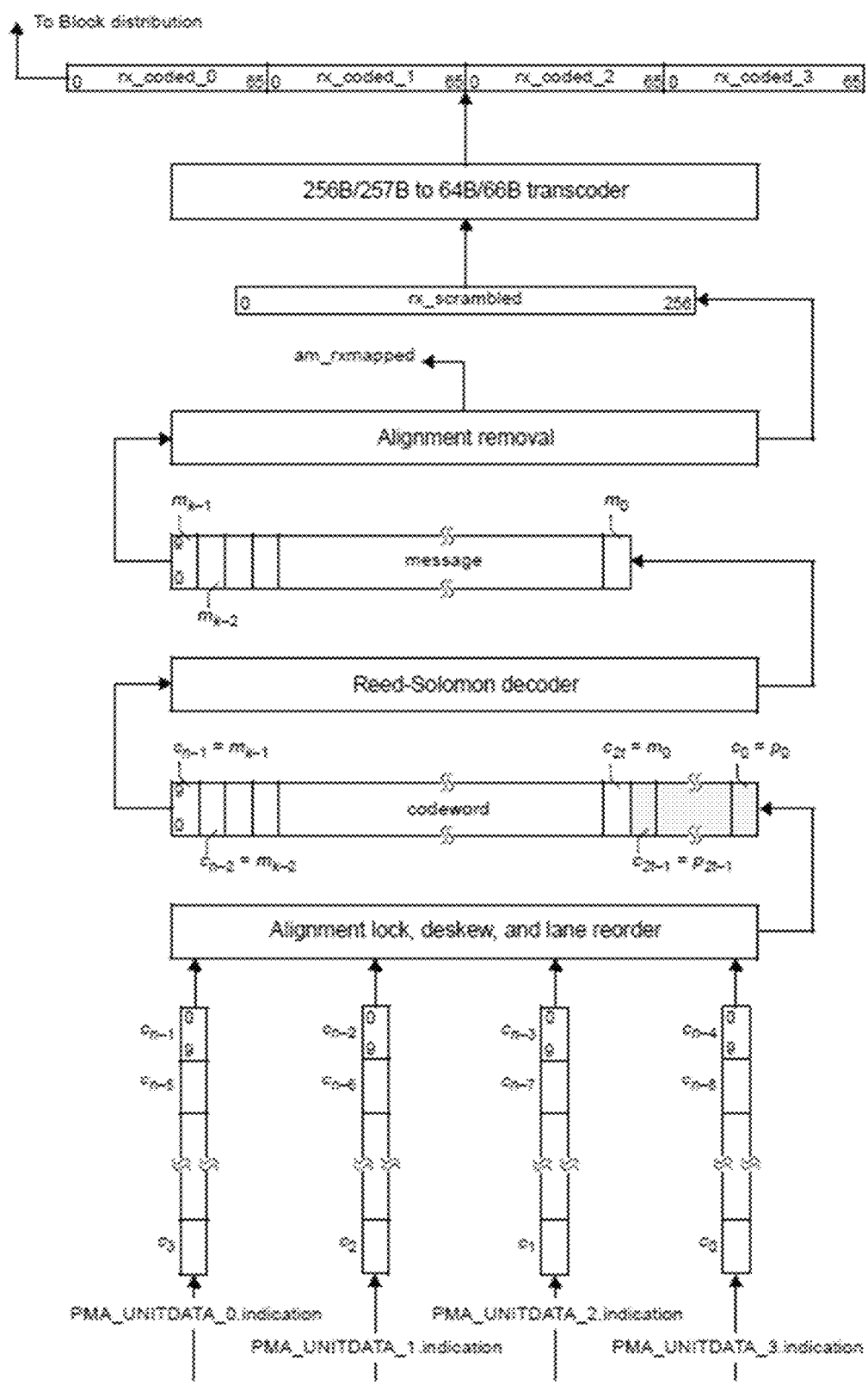
FIG. 3B is a block diagram illustrating a process for receiving and decoding data.

FIG. 3B is a block diagram illustrating a process for receiving and decoding data shown on the right side in FIG. 2. As shown, the alignment and deskew operations are performed before the Reed Solomon decoding process. It is noted that the actual implementation may vary, depending on the application. For example, the IEEE 802.3 Standard indicates that the first three of these receive functions can exist in an FEC monitor that does not participate in the data through a path. It is important to recognize that a substantial number of logic gates and memory are required for this functionality.

Figure 4:
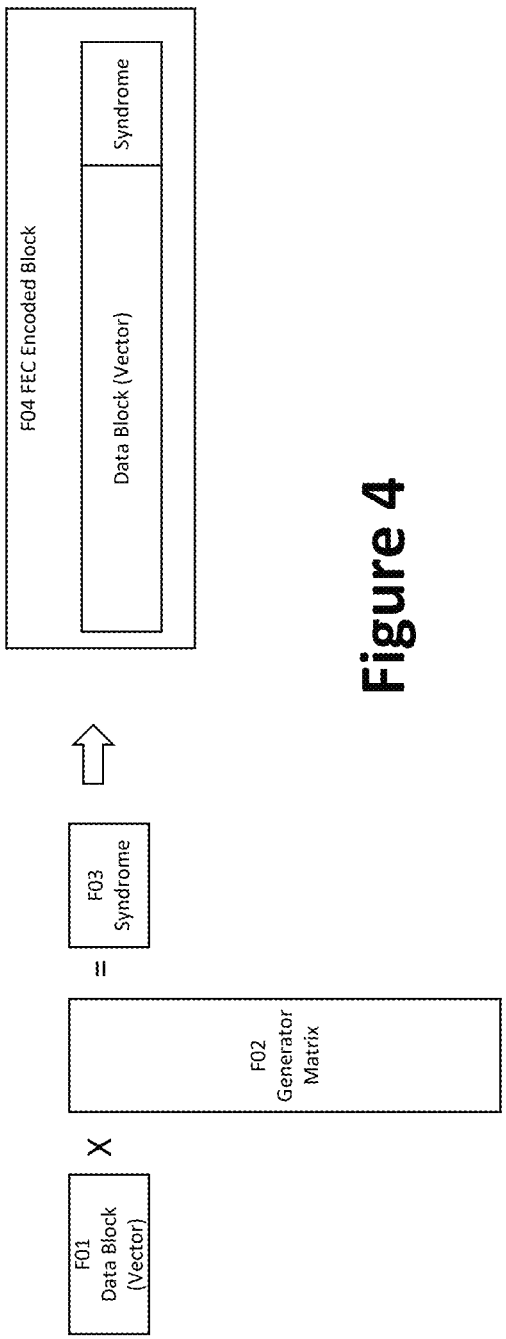
FIG. 4 is a block diagram illustrating a Reed-Solomon encoding process.

FIG. 4 is a block diagram illustrating a Reed-Solomon encoding process. Using an RS logical encoder, the data message is divided into blocks of a particular size. The encoding operation involves a matrix multiplication of the data block vector by a generator matrix to generate a syndrome, which yields a number of check symbols. The check symbols are then appended to the original data block to form the FEC codeword.

Figure 5:
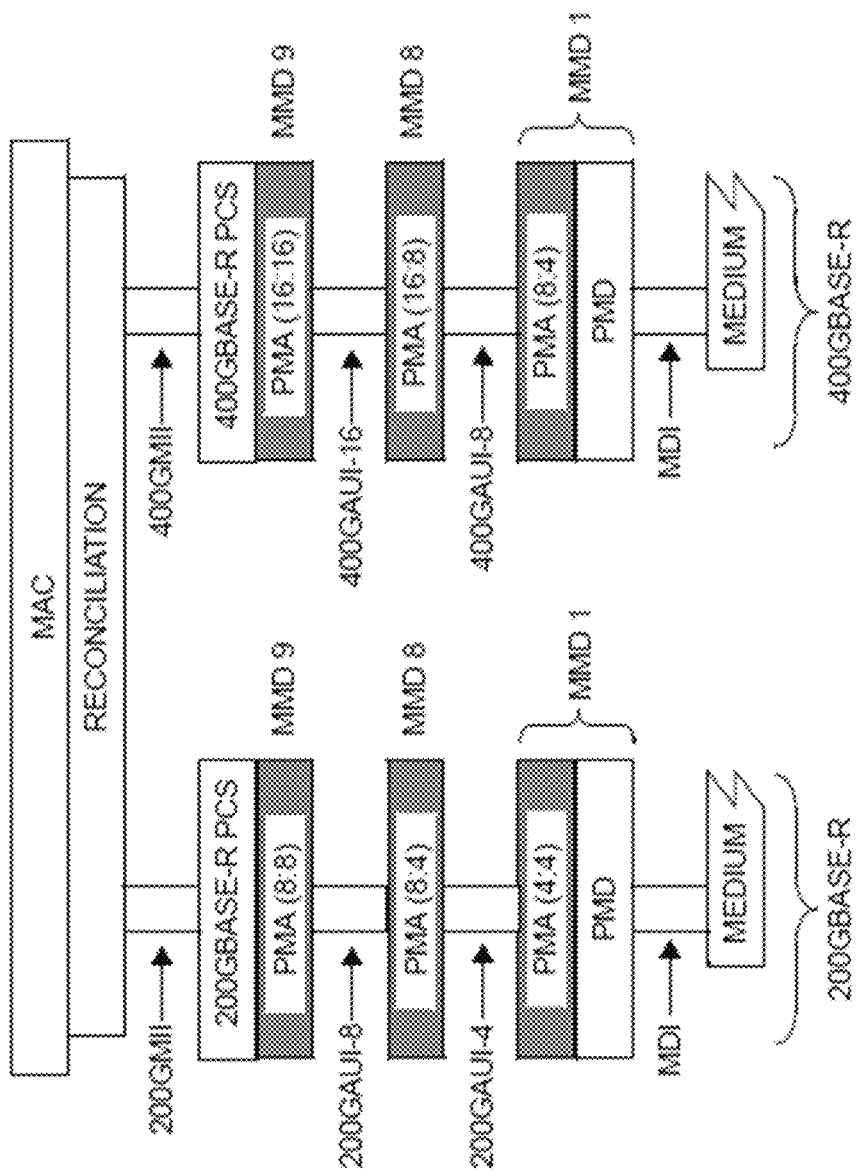
FIG. 5 is a block diagram illustrating PMA layering.

FIG. 5 is a block diagram illustrating PMA layering. For example, the physical medium attachment (PMA) layering illustrated in FIG. 5 is based on Clause 120 of the 200/400G IEEE 802.3 Ethernet Standard, which is incorporated by reference in its entirety. The diagram illustrates the existence of multiple PMA layers that serve a variety of functions. One of the functions is mapping Logical PCS channels into Logical PMA channels and ultimately Physical Medium Dependent (PMD) channels. The number of Physical PMD channels is related to—but not strictly speaking equal to— the number of PCS channels. A 200GMII interface is logically carrying a single channel of 200 Gbps. Within the PCS layer, it becomes 8 PCS channels. A PMA (8:8) connects the PCS to a 200GAUI-8 interface which uses 8 25 Gbps physical channels to carry the 200 Gbps. The PMA (8:4) layer converts from 8×25G to 4×50G lanes and the PMA (4:4) layer connects the 200GAUI-4 to the final PMD (Physical Media Device). The 400G case is shown to the right where the same layers exist but the number of PCS channels is 16 and the number of physical channels is also doubled. This operation was previously referred to as a "GearBox". When the number of input/output channels are equal, this function is referred to as a "Retimer". Different data transmission rates can be achieved through the retimer function, and BER monitoring functions can be implemented for retimer applications in various embodiments, as explained below.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object.

As explained above, it is desirable to have the capability to monitor FEC performance at intermediate points in a transmission system. In various embodiments, monitoring processes are more cost-effective and power-efficient than existing full FEC implementations. For example, an FEC monitor—providing BER information—is called "FECmon" in the present disclosure. Various embodiments may be implemented in reference to an IEEE 802.3 physical layer device, but it is understood that they are adapted to other physical layer devices or other devices that include a physical layer as a sub-unit. For example, a physical layer device that carries traffic with some form of framing protocol—to identify the location of the FEC code block for FEC functions that operate over those FEC blocks—can be implemented to incorporate various embodiments of the present invention.

It is noted that various implementations allow the FECmon to be implemented supporting any protocol where a single logical communications channel is carried over a single physical channel or multiple physical channels. For example, the FECmon can be implemented in a single integrated circuit or can be split across multiple integrated circuits. In various implementations, the FECmon mechanism can operate with different types of FEC codes, with a number of FEC encoders/decoders and interleave schemes. The use of the Reed Solomon FEC encoder, as described in the IEEE standard, is merely illustrative of the general principle.

Figure 6:
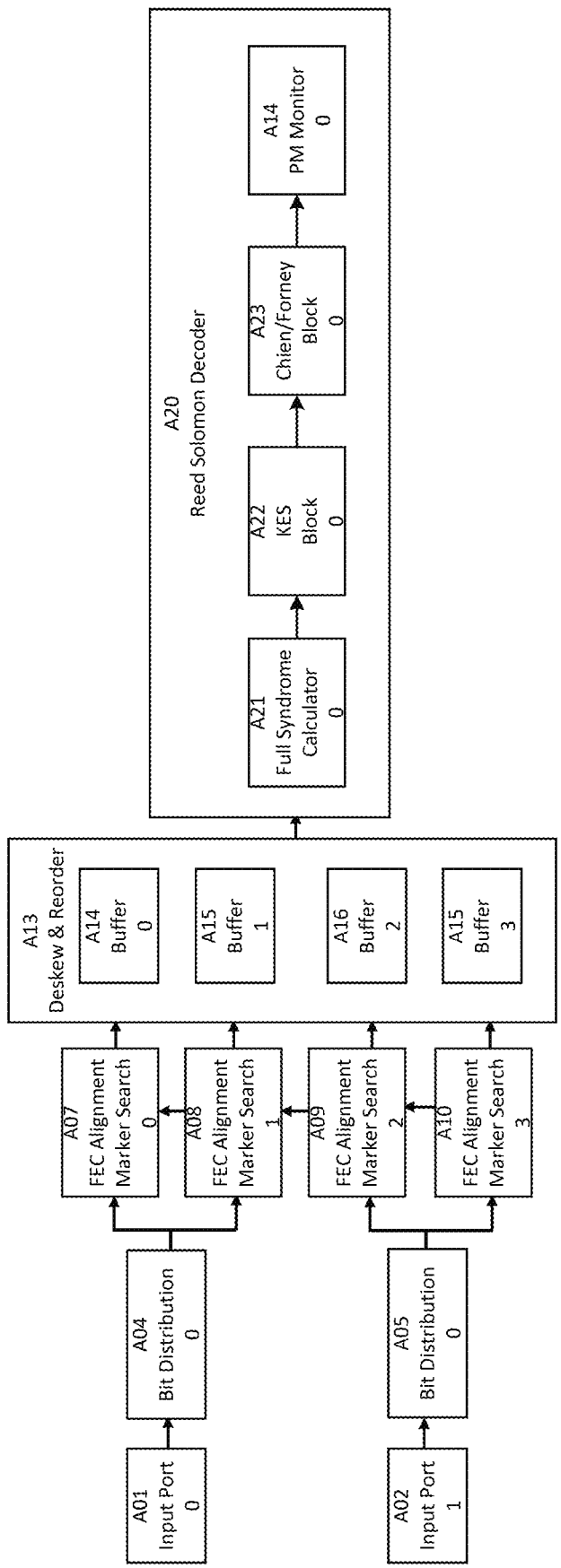
FIG. 6 is a simplified block diagram illustrating a receiver with FEC monitor according to embodiments of the present invention.

FIG. 6 is a simplified block diagram illustrating a receiver with an FEC monitor according to embodiments of the present invention. This diagram is merely an example, which should not unduly limit the scope of the claims. One of ordinary skill in the art would recognize many variations, alternatives, and modifications. As an example, the receiver in FIG. 6 is implemented as a 100G Ethernet link utilizing 2 50G PMD layers to provide a baseline, and an FEC monitor mechanism can be implemented at the decoder block A20.

The receiver includes two input ports—A01 and A02— that are configured with their respective bit-width and a clock rate. For example, the clock rate and bit-width are configured to provide the needed throughput received from the physical media layer. For example, a 53 Gbps PHY would be 64-bits wide operating at approximately 828 MHz. Blocks A04 and A05 provide distribution functions, which may be configured to operate in a round-robin and bit-by-bit fashion to generate two distinct bit-streams from the PMD data. For example, with blocks A04 and A05 each generating two-bit streams, four (i.e., 2×2) FEC lanes are provided. Blocks A07-A10 are alignment marker search engines that are configured for the FEC lanes. For example, once alignment marker framing is locked, the exact location of the FEC code blocks is determined. Block A13 provides deskew and alignment functions, and they allow for the re-ordering of FEC blocks. Blocks A14-A17 are buffers configured to store FEC blocks from the respective FEC lanes. As an example, FEC decoder A20 comprises a Reed Solomon (RS) decoder, but it is understood that FEC monitoring functions can be implemented with other decoding mechanisms as well.

An example of FEC decode function, shown as block A20, includes full syndrome calculator block A21, Key Equation Solver (KES) calculator block A22, Chien/Forney block A23, and performance monitor (PM) block A14. For example, an output of block A20 (e.g., Chien/Forney block A23) may be a set of error masks that indicated which symbols were in error. In various implementations, the performance monitor at block A14 counts the error masks to determine the actual error rate.

Figure 7:
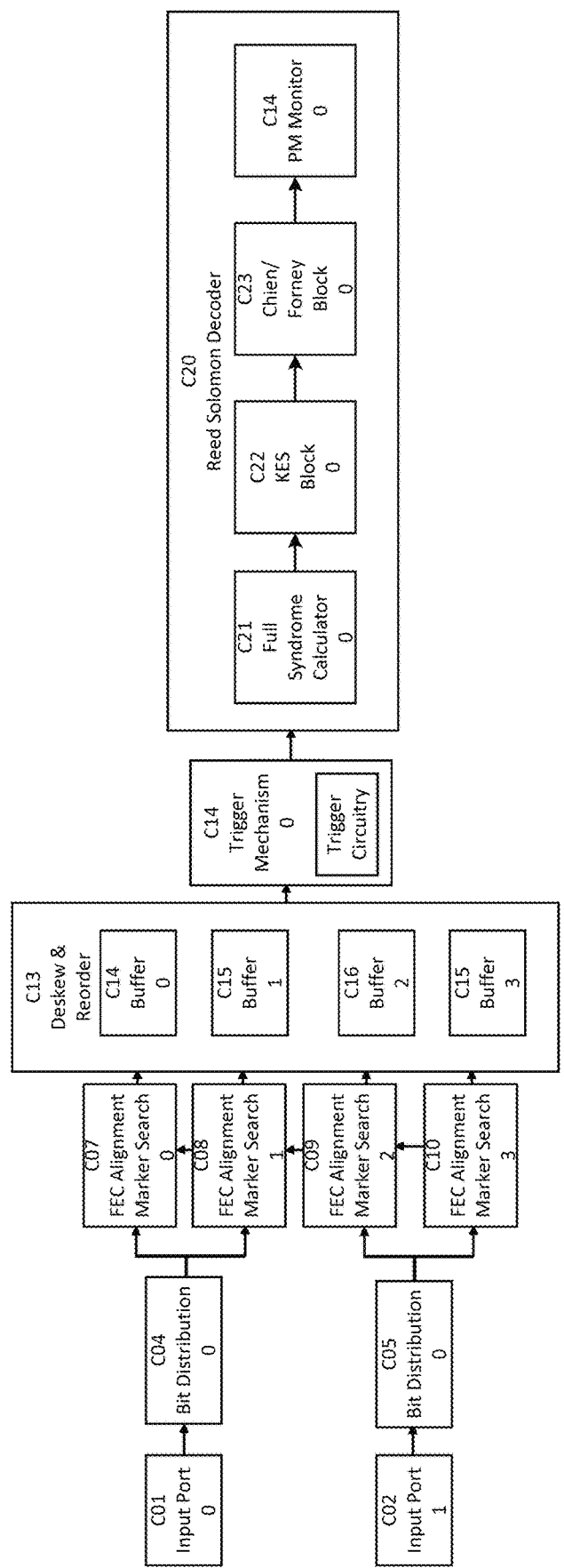
FIG. 7 is a simplified block diagram illustrating a receiver with FEC monitor and a trigger circuitry according to embodiments of the present invention.

FIG. 7 is a simplified block diagram illustrating a receiver with an FEC monitor and a trigger mechanism according to embodiments of the present invention. This diagram is merely an example, which should not unduly limit the scope of the claims. One of ordinary skill in the art would recognize many variations, alternatives, and modifications. Two streams of incoming data are received at input ports C01 and C02, and respectively distributed at bit distribution blocks C04 and C05 into four FEC streams. The four FEC streams are processed at block C07-C10. Deskew and re-order of FEC blocks processes are performed at block C13, which includes buffers C14-17. Block 14 is configured to provide a trigger mechanism for FEC monitoring. In various embodiments, block 14 acts as a filter to pass through only a sub-set of FEC block samples (sub-sampling) for—among other things—BER calculation. For example, the term "sub-sampled" refers to the concept that not all FEC blocks need to be monitored in order to create a measurement of the BER of the link.

Depending on the implementation, the trigger circuitry at block C14 can configure the FEC monitoring process; settings for FEC monitoring may include the offset from the start of frame (e.g., count of FEC blocks to ignore), the number of blocks to use for creating the FEC error statistics, the number of alignment markers to wait before starting the next sample period, and/or other settings. As an example, the sub-sampling process, as set by the trigger circuitry, involves selecting first n FEC blocks immediately after the alignment marker position, where the size of n is selected based on efficiency, speed, power consumption, and/or other factors. For example, decoder C20 may be used as a part of the FEC monitoring process. For example, RS decoding is performed, but other FEC decoding mechanisms may be used as well. Decoder C20 includes full syndrome calculator C21, KES block C22, Chien/Forney block C23, and PM monitor C24.

Figure 8:
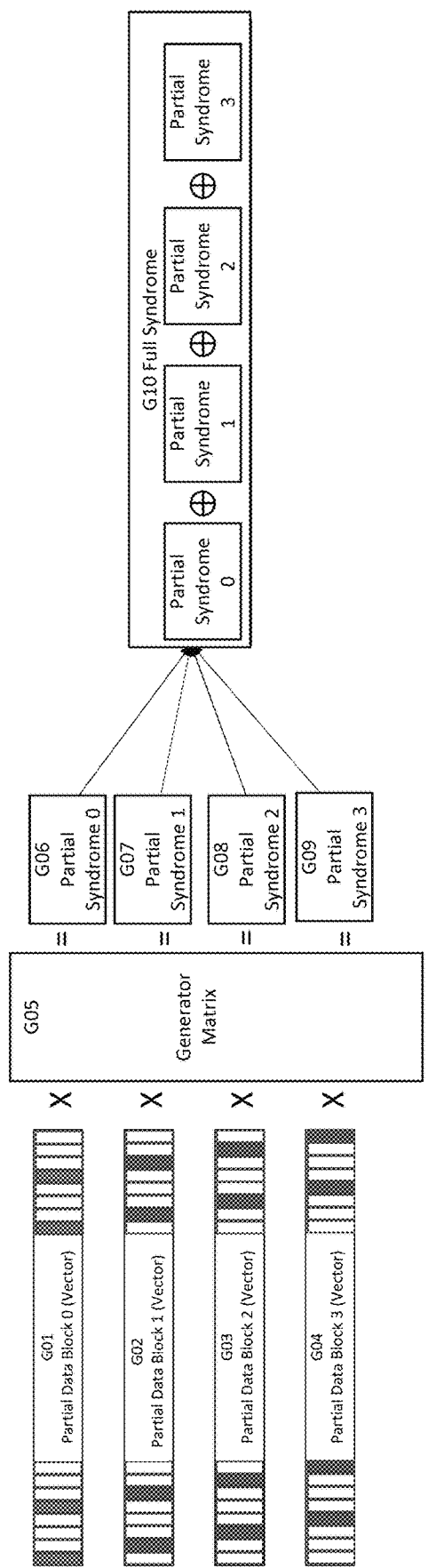
FIG. 8 is a simplified block diagram illustrating the calculation of partial syndrome values according to embodiments of the present invention.

FIG. 8 is a simplified block diagram illustrating the calculation of partial syndrome values according to embodiments of the present invention. This diagram is merely an example, which should not unduly limit the scope of the claims. One of ordinary skill in the art would recognize many variations, alternatives, and modifications. Partial data blocks G01-G04 are processed by generator matrix G05, which provides partial syndromes G06-G09. The partial syndromes are used for BER determination and later combined to become full syndrome for processing as block G10. For example, G10 uses the exclusive OR (XOR) operator to obtain full syndrome from the partial syndrome. In various embodiments, partial syndrome calculations are performed as a part of the FEC decoding process, and they are performed by a receiver with FECmon function. As shown, syndrome—as used in FEC decoding operations—can be split into partial syndrome calculations that operate on a subset of the FEC block data. FIG. 8 shows the code words that are valid in a given subset, where the subsets correspond to the FEC code words when distributed into FEC lanes. The mathematics underlying FEC schemes (e.g., matrix computations over a Galois Field) makes the decomposition of the problem into partial syndromes possible, where the partial syndromes can then be combined to create a full syndrome using reduced and simple mathematics. It is noted that a partial syndrome, as used in various embodiments, acts as a value with a masked region; a partial syndrome may include a long string of zeros to fill in the "masked" section, and the sections that include zeroes and ones contain actual data. It is noted that by using partial syndrome value, the number of error calculations can be reduced, and error calculations can be performed by more than one processor or chips, as syndrome values can be passed between two or more chips.

An important aspect of this process is that the partial syndromes are significantly smaller than the original data block. In fact, it is mathematically provable that the syndromes are a summary of the data reduced to a minimum size (with largest possible compression) of all the relevant FEC data. It is this large reduction in the size that makes transmitting the partial syndromes from one device to another device both power efficient and mathematically complete in its ability to measure the error rate.

Figure 9:
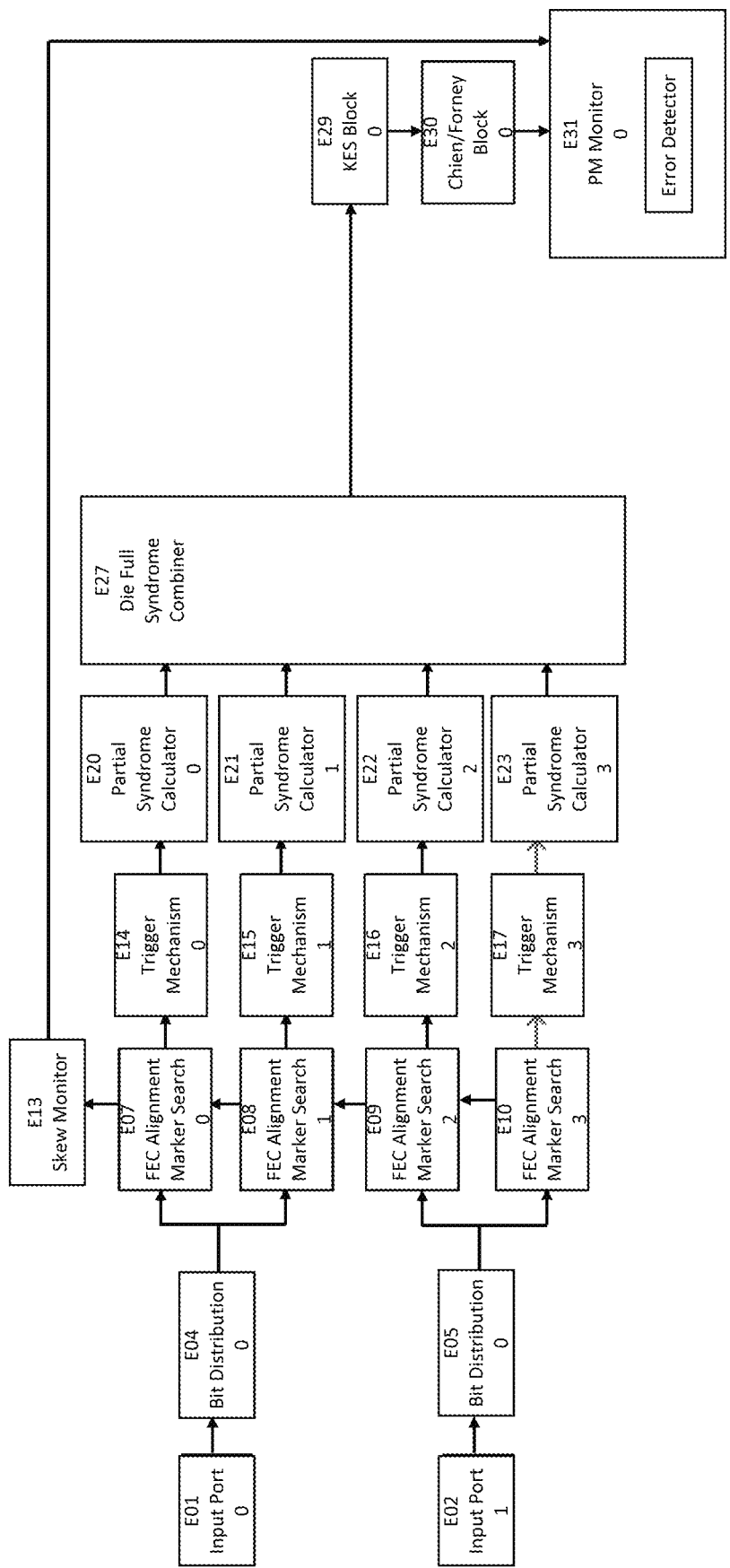
FIG. 9 is a simplified diagram illustrating a receiver with partial syndrome calculators according to embodiments of the present invention.

FIG. 9 is a simplified diagram illustrating a receiver with partial syndrome calculators according to embodiments of the present invention. This diagram is merely an example, which should not unduly limit the scope of the claims. One of ordinary skill in the art would recognize many variations, alternatives, and modifications. Two data streams, with FEC encoded data blocks, are received at block E01 and E02, and they are distributed into four FEC data streams by bit distribution blocks E04 and E05. In various embodiments, block E13 (also called skew monitoring circuitry) monitors skews determined at blocks E07-E10 (i.e., FEC alignment marker search blocks) and provides the skew information to PM monitor block E31. It is to be noted that each FEC data stream is coupled with its respective trigger circuitry as shown in FIG. 7. The trigger circuitries are configured to provide a sub-sample of the partial FEC blocks. For example, blocks E14-E17 correspond to blocks E07-E10 as shown. For example, the trigger mechanisms operate with subsampling settings, and the subsampled FEC data are used for partial syndrome calculation at blocks E20-E23. In various embodiments, partial syndrome calculations can occur without the need to reassemble the FEC lanes into a single FEC block. The partial syndrome calculators—block E20-E23—operate on the sub-sampled data and provide the data to block E27, which is the die full syndrome combiner. In various implementations, the combiner E27 does include a deskew/alignment function, but requires far less memory (and fewer gates) since the process only needs to combine the partial syndrome data rather than combining the full FEC blocks. The deskewed data is XORed together (e.g., as illustrated in FIG. 8) to produce the full syndrome for each FEC block. The full syndrome data are then processed using the FEC decoding circuitry that includes, among others, KES block E29 and Chien/Forney block E30. For example, the PM monitor at block E31 uses information from both block E30 and block E13 to determine line quality. In various embodiments, the PM monitor includes many registers (e.g., over 70 in some instances) that provide statistical data related to device performance, and these registers can be used in many ways. For example, skew information from block E13 may be used to calculate or otherwise determine the values stored at PM monitor registers.

Figure 10:
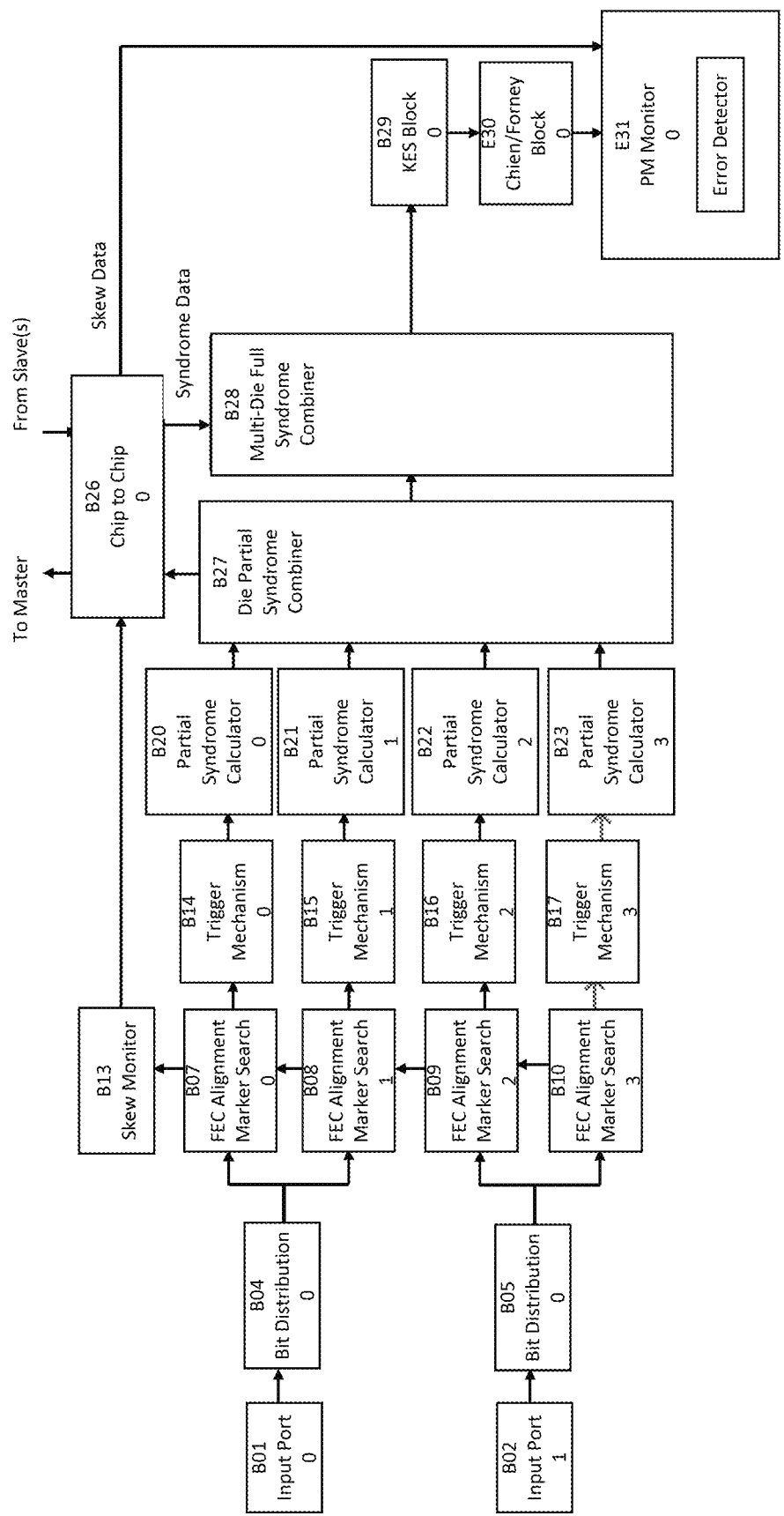
FIG. 10 is a simplified diagram illustrating a receiver with a chip-to-chip interface according to embodiments of the present invention.

The performance monitor (PM, shown as PM monitor) comprises an error detector from which BER and other statistical data related to device performance are derived. The error detector is shown in FIGS. 9 and 10 and while not shown, is similarly included in the PM monitor blocks shown in FIGS. 6 and 7. The statistical data are derived from the partial syndrome calculators and the PM. As used herein, performance includes the likelihood of a bit error. The various FEC statistical data help determine the bit errors that can be corrected by utilizing the FEC decoding, the likelihood of those correctable bit errors, and an error that the FEC cannot correct. The statistical data are for RS FECs and are different for different kinds of FEC encoding. In general, non-limiting examples of the statistical data can include the following.

1. Total processed codewords: from which the total number of bits that the monitor has processed stats for can be derived;
2. Corrected codewords: codewords that have bit errors which will be corrected by the FEC decoder;
3. Uncorrected codewords: codewords that have many bit errors and where the FEC decoder will be unable to correct (these errors will result in packet errors and retransmissions as described herein);
4. Errored bits: used to derive the BER, presented as two values:
   a. Number of 0's that would be corrected to a 1,
   b. Number of 1's that would be corrected to a 0;
5. N symbol histogram: range of statistics representing codewords with N symbol errors, with N from 1 to 15 symbols/codewords (15 is the largest number of bit errors that an RS544 FEC can correct, above which a codeword is regarded as uncorrectable); and
6. Per-FEC-lane symbol error counts (similar to the other counts described above but this count is specific to each partial syndrome calculator (e.g., blocks E20/21/22/23 in FIG. 9 and blocks B20/21/22/23 in FIG. 10), whereas the rest of the above statistics are on the combined data).

From these statistics, the following performance metrics about the link can be derived:

i. BER: (4) Errored bits and (1) total codewords to derive the BER of the network segment/hop prior to the FEC correction, which is a key performance statistic;
ii. (3) uncorrected codewords which is an error indicator signifying that some higher-level mechanism such as retransmission needs to be used for that packet; and
iii. N symbol histogram which is used to indicate how close the errors are to the 16 errors/codeword RS544 FEC limit; the higher the counts in the upper N bins, the higher the likelihood of uncorrected codewords in the future.

As an example, if a CW with 4 bit errors is detected, then the counters are incremented as follows:
   A. +1 to total processed CWs
   B. +1 to corrected CWs;
   C. +4 to the errors bits counters;
   D. +1 to the $4^{th}$ statistic counter in the N symbol histogram (i.e., N=4); and
   E. +1 (possibly) to one of the per-FEC-lane symbol error counters.

FIG. 10 is a simplified diagram illustrating a receiver with a chip-to-chip interface according to embodiments of the present invention. This diagram is merely an example, which should not unduly limit the scope of the claims. One of ordinary skill in the art would recognize many variations, alternatives, and modifications. In various embodiments, the FEC decoding and error monitoring function is split across multiple dies. For example, the FEC decoding and monitoring can be used in 200/400G Ethernet; the FEC scheme is similar, but the number of FEC lanes is doubled (8 lanes for 200) and then doubled again (16 lanes for 400). The principle of partial syndrome calculations scales well for a wide range of applications due to the round-robin distribution of FEC code words to FEC lanes. For example, each die computes the partial code words for its subset of the FEC lane data and then passes the data to a single die that then combines the information from all die. FIG. 10 shows the scaling of two dies, but it is noted that data can be split into more than two dies.

In FIG. 10, two data streams, with FEC encoded data blocks, are received at block B01 and B02 and distributed into four FEC data streams by bit distribution blocks E04 and E05. In various embodiments, block E13 monitors skews determined at blocks E07-10 (i.e., FEC alignment marker search blocks) and provides the skew information to PM monitor block E31. In various embodiments, E13 generates a relative skew value based on the relative positions of alignment markers at the respective FEC lanes. For example, block E08 monitors skew between alignment markers in a first data stream and a second data stream. For example, block E08 calculates a difference between positions of a first alignment marker and a second alignment marker indicative of skew, where the first alignment marker is associated with a first data stream, and the second alignment marker is associated with a second data stream. For example, block E08 may be the first block to process the very first alignment marker, and block E09 may be the last block to process this first alignment marker, and the difference between the times the blocks E08 and E09 process the first alignment marker is the skew value measured at block E13. It is to be noted that each FEC data stream is coupled with its respective trigger circuitry as shown in FIG. 7. The trigger circuitries are configured to provide a sub-sample of the partial FEC blocks. For example, blocks E14-E17 correspond to blocks E07-E10 as shown. For example, the trigger circuitries operate with subsampling settings, and the subsampled FEC data are used for partial syndrome calculation at blocks E20-E23. In various embodiments, partial syndrome calculations can occur without the need to reassemble the FEC lanes into a single FEC block. The chip-to-chip (C2C) interface, shown as block B26, allows partial syndrome data and skew data (from block B13) transmitted to the partner chip. It is noted that the C2C interface enables the complete interface to be partitioned over multiple devices. For example, the C2C interface includes both master and slave portions. The slave portion transmits its partial syndrome (e.g., from block B27) and skew information (e.g., from block B13) to the master. The master portion receives the data and forwards it to the multi-die full syndrome combiner (e.g., block B28). FIG. 9 shows the location of the partial syndrome calculator blocks as a way to split the syndrome calculation across 2 blocks (partial and full). FIG. 10 shows the same partial syndrome calculator and two more blocks, one that combines partial syndromes for one die and another that combines the partial syndromes for two dies.

Figure 11:
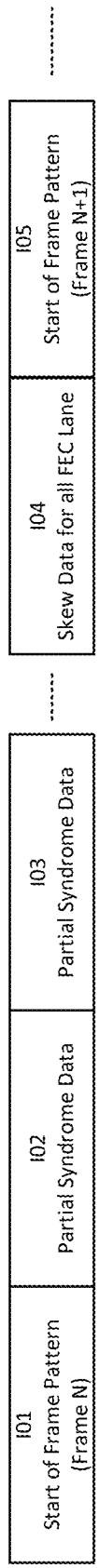
FIG. 11 is a simplified diagram illustrating data exchanged over a chip-to-chip interface according to embodiments of the present invention.

FIG. 11 is a simplified diagram illustrating data exchanged over a chip-to-chip interface according to embodiments of the present invention. This diagram is merely an example, which should not unduly limit the scope of the claims. One of ordinary skill in the art would recognize many variations, alternatives, and modifications. FIG. 11 shows an example of the data passed between slave and master dies over a chip-to-chip interface. For example, the start of frame pattern (block I01) is followed by the partial syndrome data (blocks I02, I03, etc.), and then the skew data (block I04) for the FEC lanes present in the data.

Figure 12:
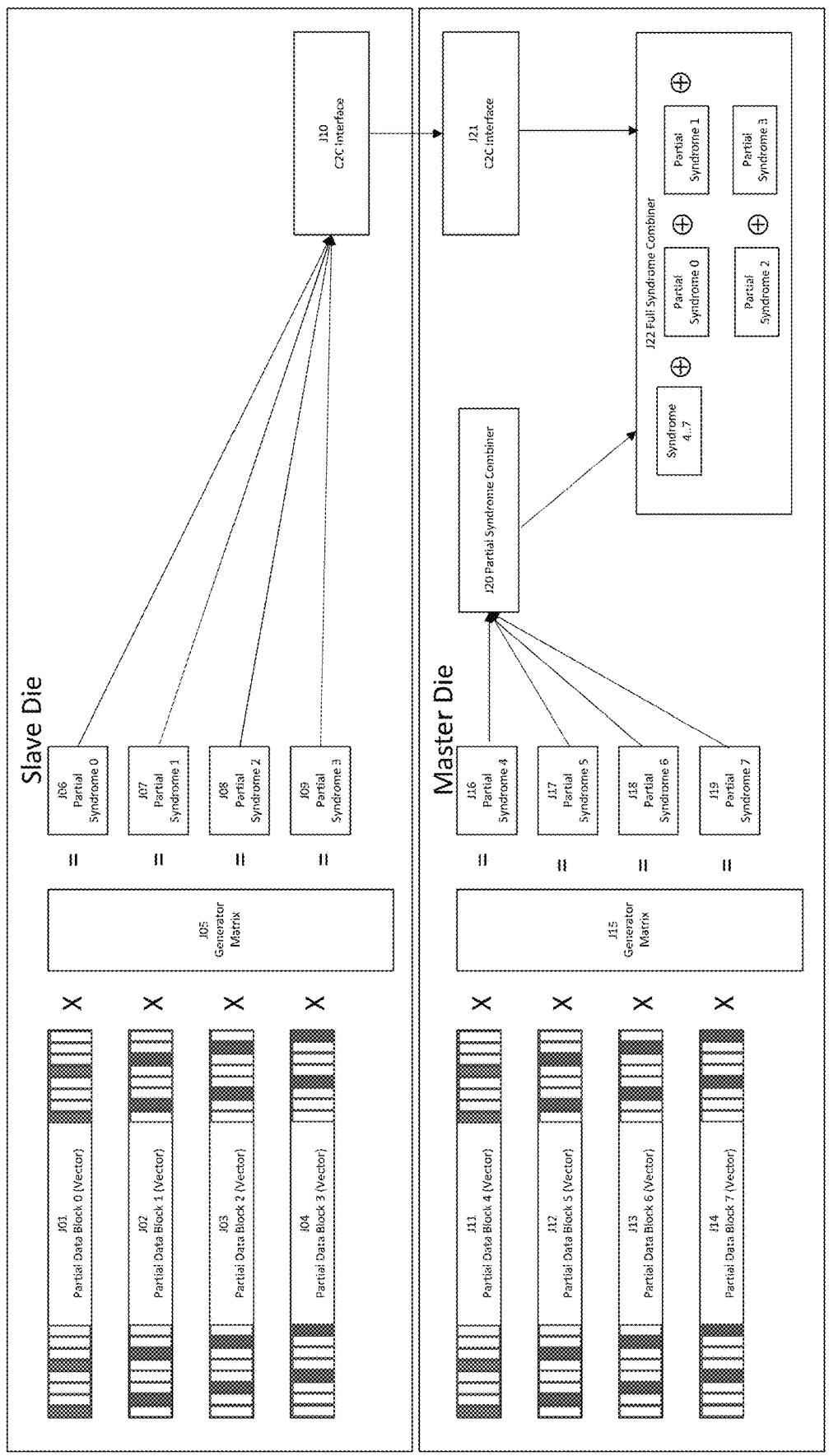
FIG. 12 is a simplified diagram illustrating a communication device with a 200 G interface according to embodiments of the present invention.

FIG. 12 is a simplified diagram illustrating a communication device with a 200G interface according to embodiments of the present invention. This diagram is merely an example, which should not unduly limit the scope of the claims. One of ordinary skill in the art would recognize many variations, alternatives, and modifications. For example, a 200G communication interface is partitioned over 2 devices (slave die and master die as shown). For example, data streams at blocks J01-J04 (and blocks J11-J14) each carry 25G of data. The slave die and the master die each has its own generator matrix (blocks J05 and J15) that generates partial syndrome-blocks J06-J09 for the slave die and blocks J16-J19 for the master die. For example, partial syndromes from the slave die are transmitted to the master die via communication interfaces (block J10 at the slave die and block J21 at the master die). Partial syndromes from both master and slave dies are combined at the full syndrome combiner at block J22, where block J20 combines partial syndrome from block J16-J19. It is to be understood that more than two dies can be combined similarly according to various implementations.

Figure 13:
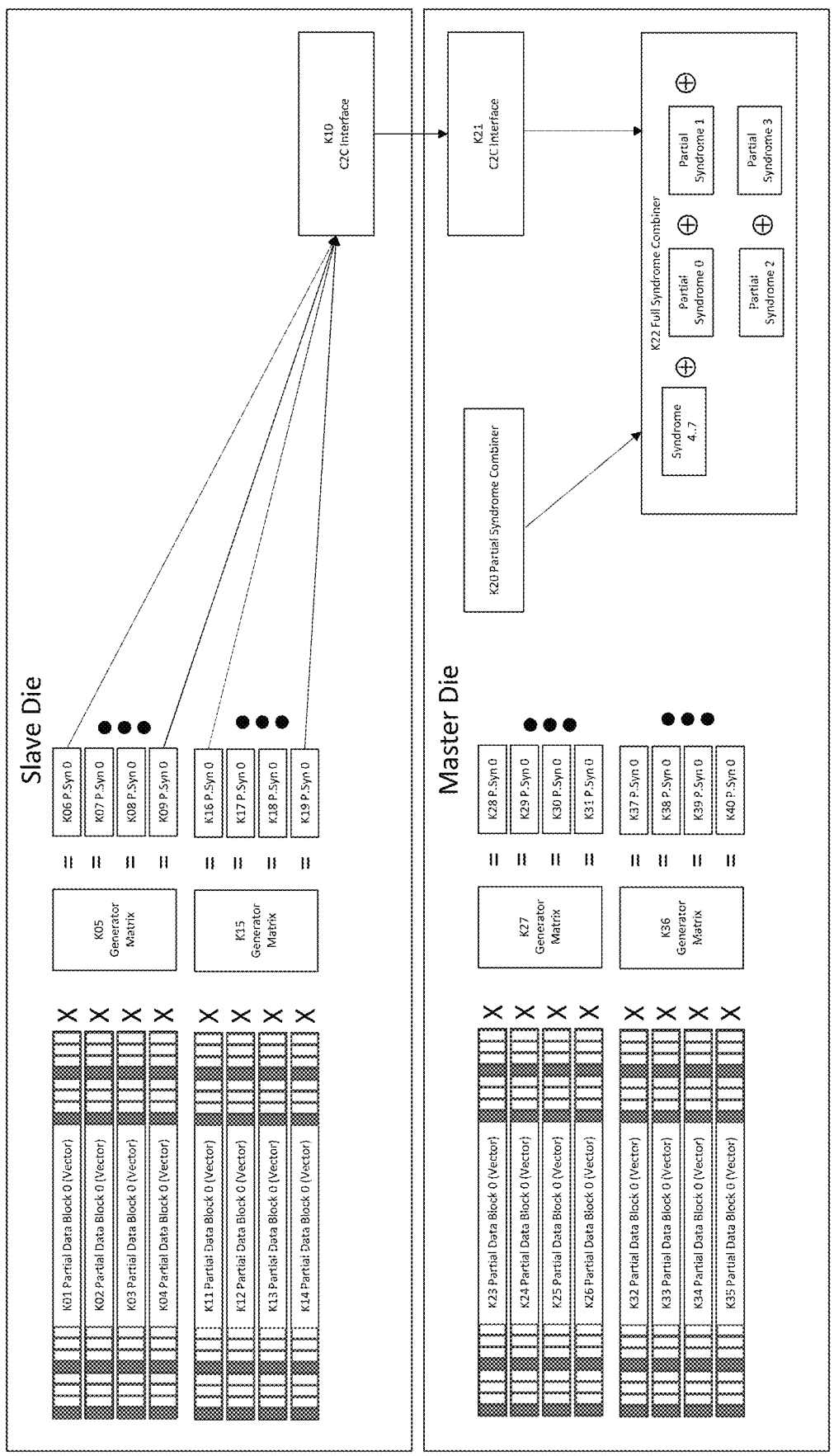
FIG. 13 is a simplified diagram illustrating a communication device with a 400G interface according to embodiments of the present invention.

FIG. 13 is a simplified diagram illustrating a communication device with a 400G interface according to embodiments of the present invention. This diagram is merely an example, which should not unduly limit the scope of the claims. One of ordinary skill in the art would recognize many variations, alternatives, and modifications. As an example, an FEC monitor can be scaled to operate on 400G of data. While the device might be configured for a single 400G channel, it is also possible that it would be carrying 4 independent 100G channels. One of the advantages of the sub-sampled FEC monitor is that because it monitors periodically, it is possible to switch the monitoring function between different physical streams without additional hardware, which further reduces complexity, increase speed, and decreases power consumption.

Accordingly, in one embodiment, a receiver device comprises a first input port for receiving a first data stream, where the first data stream comprises encoded data blocks; a first distribution circuitry configured to distribute the first data stream into a first FEC data stream and a second FEC data stream; a first alignment circuitry configured to align FEC data blocks of the first FEC data stream; a first trigger circuitry coupled to the first alignment circuitry and configured to select a first plurality of FEC data blocks from the first data stream, where the first plurality of FEC data blocks is based on a predetermined subset of the encoded data blocks; a first partial syndrome calculator configured to determine a first partial syndrome based on the first plurality of FEC data blocks; a syndrome combiner configured to generate a full syndrome by combining the first partial syndrome with at least a second partial syndrome; and an FEC decoder configured to determine an error rate associated with a network segment through which the first data stream is received using at least the full syndrome.

The receiver device further comprises a skew monitoring circuitry coupled to the first alignment circuitry to monitor skew between alignment markers in the first data stream and a second data stream. The skew monitoring circuitry is configured to calculate a difference between positions of a first alignment marker and a second alignment marker, where the first alignment marker is associated with the first data stream, the second alignment marker is associated with the second data stream. The receiver device further comprises a performance monitor coupled to the skew monitoring circuitry and the FEC decoder to monitor performance of the network segment based on the error rate.

In other features, in the receiver device, the first partial syndrome calculator is further configured to determine a first bit-error rate. The predetermined subset is selected based on a power consumption metric and/or an accuracy metric.

The receiver device further comprises a second input port for receiving a second data stream; a second distribution circuitry for distributing the second data stream into the second FEC data stream; a second alignment circuitry configured for aligning the second FEC data stream; a second trigger circuitry configured to select a second plurality of FEC data blocks from the second data stream; and a second partial syndrome calculator configured to determine the second partial syndrome based on the second plurality of FEC data blocks, where the first partial syndrome calculator is configured on a first chip, the second partial syndrome calculator is configured on a second chip, and the error rate is associated with the network segment configured between the first chip and the second chip.

In other features, in the receiver device, the first partial syndrome calculator comprises a generator matrix for processing the first plurality of FEC data blocks and generating at least the first partial syndrome.

The receiver device further comprises a chip-to-chip interface configured to transmit the first partial syndrome from a first chip to a second chip. The receiver device further comprises a partial syndrome combiner configured to generate a partially combined syndrome by combining at least the first partial syndrome determined based on the first plurality of FEC data blocks selected from the first data stream and the second partial syndrome determined based on a second plurality of FEC data blocks selected from a second data stream. The receiver device further comprises a full syndrome combiner configured to combine the partially combined syndrome with a third syndrome received from the second chip.

In other features, in the receiver device, the FEC decoder comprises an RS decoder. The FEC decoder comprises a KES circuitry. The FEC decoder comprises a Chien/Forney circuitry configured to output a set of error masks that indicate which symbols in the first data stream were in error, and the receiver device further comprising a performance monitor configured to determine the error rate based on the error masks.

In another embodiment, a receiver device comprises an input port for receiving a data stream, where the data stream comprises encoded data blocks; a distribution circuitry for distributing the data stream into a first FEC data stream and a second FEC data stream; a first alignment circuitry configured for aligning FEC data blocks of the first FEC data stream; a second alignment circuitry configured for aligning the second FEC data stream; a first trigger circuitry coupled to the first alignment circuitry, where the first trigger circuitry is configured to select a first plurality of FEC data blocks from the data stream; a second trigger circuitry coupled to the second alignment circuitry; a first partial syndrome calculator configured to determine a first partial syndrome; a second partial syndrome calculator configured to determine a second partial syndrome; a syndrome combiner configured to generate a full syndrome by combining the first partial syndrome with at least the second partial syndrome; and an FEC decoder configured to decode the full syndrome.

In the receiver device, the first plurality of FEC data blocks is used for a BER calculation. The data stream comprises a frame pattern section, a partial syndrome data section, and a skew data section. The receiver device further comprises a first generator matrix for generating the first partial syndrome and a second generator matrix for generating the second partial syndrome.

In yet another embodiment, a data communication method comprises receiving a data stream from a communication link; distributing the data stream to a first FEC stream and a second FEC stream; aligning the first FEC stream; aligning the second FEC stream; generating a first partial syndrome based on a predetermined subset of FEC blocks of the first FEC stream; generating a second partial syndrome based on the second FEC stream; determining a BER value using at least the first partial syndrome; generating a full syndrome using at least the first partial syndrome and the second partial syndrome; and decoding the full syndrome.

The method further comprises calculating a skew value associated with at least the first FEC stream and the second FEC stream. The method further comprises identifying a network segment over which the data stream is transferred and determining a performance of the network segment based on the BER value.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A receiver device comprising:
   a first input port for receiving a first data stream, the first data stream comprising encoded data blocks;
   a first distribution circuitry configured to distribute the first data stream into a first FEC data stream and a second FEC data stream;
   a first alignment circuitry configured to align Forward Error Correction (FEC) data blocks of the first FEC data stream;
   a first trigger circuitry coupled to the first alignment circuitry, the first trigger circuitry being configured to select a first plurality of FEC data blocks from the first data stream, the first plurality of FEC data blocks being based on a predetermined subset of the encoded data blocks;
   a first partial syndrome calculator configured to determine a first partial syndrome based on the first plurality of FEC data blocks;
   a syndrome combiner configured to generate a full syndrome by combining the first partial syndrome with at least a second partial syndrome; and
   an FEC decoder configured to determine an error rate associated with a network segment through which the first data stream is received using at least the full syndrome.

2. The receiver device of claim 1 further comprising a skew monitoring circuitry coupled to the first alignment circuitry to monitor skew between alignment markers in the first data stream and a second data stream.

3. The receiver device of claim 2 wherein the skew monitoring circuitry is configured to calculate a difference between positions of a first alignment marker and a second alignment marker, the first alignment marker being associated with the first data stream, the second alignment marker being associated with the second data stream.

4. The receiver device of claim 2 further comprising a performance monitor coupled to the skew monitoring circuitry and the FEC decoder to monitor performance of the network segment based on the error rate.

5. The receiver device of claim 1 wherein the first partial syndrome calculator is further configured to determine a first bit-error rate.

6. The receiver device of claim 1 wherein the predetermined subset is selected based on a power consumption metric and/or an accuracy metric.

7. The receiver device of claim 1 further comprising:
   a second input port for receiving a second data stream;
   a second distribution circuitry for distributing the second data stream into the second FEC data stream;
   a second alignment circuitry configured for aligning the second FEC data stream;
   a second trigger circuitry configured to select a second plurality of FEC data blocks from the second data stream; and
   a second partial syndrome calculator configured to determine the second partial syndrome based on the second plurality of FEC data blocks, the first partial syndrome calculator being configured on a first chip, the second partial syndrome calculator being configured on a second chip, the error rate being associated with the network segment configured between the first chip and the second chip.

8. The receiver device of claim 1 wherein the first partial syndrome calculator comprises a generator matrix for processing the first plurality of FEC data blocks and generating at least the first partial syndrome.

9. The receiver device of claim 1 further comprising a chip-to-chip interface configured to transmit the first partial syndrome from a first chip to a second chip.

10. The receiver device of claim 9 further comprising a partial syndrome combiner configured to generate a partially combined syndrome by combining at least the first partial syndrome determined based on the first plurality of FEC data blocks selected from the first data stream and the second partial syndrome determined based on a second plurality of FEC data blocks selected from a second data stream.

11. The receiver device of claim 10 further comprising a full syndrome combiner configured to combine the partially combined syndrome with a third syndrome received from the second chip.

12. The receiver device of claim 1 wherein the FEC decoder comprises an Reed-Solomon (RS) decoder.

13. The receiver device of claim 1 wherein the FEC decoder comprises a Key Equation Solver (KES) circuitry.

14. The receiver device of claim 1 wherein the FEC decoder comprises a Chien/Forney circuitry configured to output a set of error masks that indicate which symbols in the first data stream were in error, the receiver device further comprising a performance monitor configured to determine the error rate based on the error masks.

15. A receiver device comprising:
   an input port for receiving a data stream, the data stream comprising encoded data blocks;
   a distribution circuitry for distributing the data stream into a first Forward Error Correction (FEC) data stream and a second FEC data stream;
   a first alignment circuitry configured for aligning FEC data blocks of the first FEC data stream;
   a second alignment circuitry configured for aligning the second FEC data stream;
   a first trigger circuitry coupled to the first alignment circuitry, the first trigger circuitry being configured to select a first plurality of FEC data blocks from the data stream;
   a second trigger circuitry coupled to the second alignment circuitry;
   a first partial syndrome calculator configured to determine a first partial syndrome;
   a second partial syndrome calculator configured to determine a second partial syndrome;
   a syndrome combiner configured to generate a full syndrome by combining the first partial syndrome with at least the second partial syndrome; and
   an FEC decoder configured to decode the full syndrome.

16. The receiver device of claim 15 wherein the first plurality of FEC data blocks is used for a Bit Error Rate (BER) calculation.

17. The receiver device of claim 15 further comprising a first generator matrix for generating the first partial syndrome and a second generator matrix for generating the second partial syndrome.

18. The receiver device of claim 15 wherein the data stream comprises a frame pattern section, a partial syndrome data section, and a skew data section.

19. A data communication method comprising:
   receiving a data stream from a communication link;
   distributing the data stream to a first Forward Error Correction (FEC) stream and a second FEC stream;
   aligning the first FEC stream;
   aligning the second FEC stream;
   generating a first partial syndrome based on a predetermined subset of FEC blocks of the first FEC stream;
   generating a second partial syndrome based on the second FEC stream;
   determining a Bit Error Rate (BER) value using at least the first partial syndrome;
   generating a full syndrome using at least the first partial syndrome and the second partial syndrome; and
   decoding the full syndrome.

20. The method of claim 19 further comprising calculating a skew value associated with at least the first FEC stream and the second FEC stream.

21. The method of claim 19 further comprising identifying a network segment over which the data stream is transferred and determining a performance of the network segment based on the BER value.

* * * * *